United States Patent [19]
Ishiguro

[11] 3,792,648
[45] Feb. 19, 1974

[54] EXPOSURE WARNING CIRCUIT FOR PHOTOGRAPHIC CAMERAS

[75] Inventor: Yasuo Ishiguro, Tokyo, Japan

[73] Assignee: Kabushiki Kaisha Koparu, Tokyo-to, Japan

[22] Filed: Feb. 23, 1973

[21] Appl. No.: 335,430

[30] Foreign Application Priority Data
Feb. 25, 1972   Japan............................ 47/19470

[52] U.S. Cl. ............................................. 95/10 CE
[51] Int. Cl. ............................................. G03b 7/00
[58] Field of Search ............. 95/10 CE; 250/214 P

[56] References Cited
UNITED STATES PATENTS
3,581,643   6/1971   Yoshimura.......................... 95/10 X
3,603,799   9/1971   Nobusawa.......................... 95/10 UX Primary Examiner—Joseph F. Peters, Jr.
Assistant Examiner—Michael L. Gellner
Attorney, Agent, or Firm—Cushman, Darby and Cushman

[57] ABSTRACT

An exposure warning circuit for accurately warning whether a photograph to be taken will be over-exposed, properly exposed or under-exposed prior to photographing, comprising an exposure pulse generating circuit, reference pulse generating circuits, pulse-width comparison circuits and indicating means.

14 Claims, 3 Drawing Figures 3,792,648

EXPOSURE WARNING CIRCUIT FOR PHOTOGRAPHIC CAMERAS

BACKGROUND OF THE INVENTION

Field of the Invention

The present invention relates to photographic cameras and more particularly, to an exposure warning circuit for photographic cameras.

DESCRIPTION OF THE PRIOR ART

An exposure warning for photographic cameras has been given by directly measuring the resistance value of a photoconductive cell, which is a light receiving element. Generally, however, the resistance value of a photoconductive cell changes in logarithmic relation to the light intensity. Therefore, when the intensity of the incident light from the object to the photoconductive cell, i.e., when the brightness of the object to be photographed changes in a wide range, it is very difficult to measure the resistance value of the photoconductive cell over the whole range and consequently, the exposure warning is not given properly.

SUMMARY OF THE INVENTION

It is, therefore, a primary object of the present invention to provide an exposure warning circuit for a photographic camera being capable of always giving a proper exposure warning over the whole range of exposure to be controlled by the given camera.

The object of the present invention is accomplished by converting the brightness of the object to an exposure pulse having a pulse width corresponding to the value of the brightness, by comparing said exposure pulse with a reference pulse having a certain predetermined pulse width and by operating a suitable indicating device according to the result of comparison.

DESCRIPTION OF THE PREFERRED EMBODIMENTS

Figure 1:
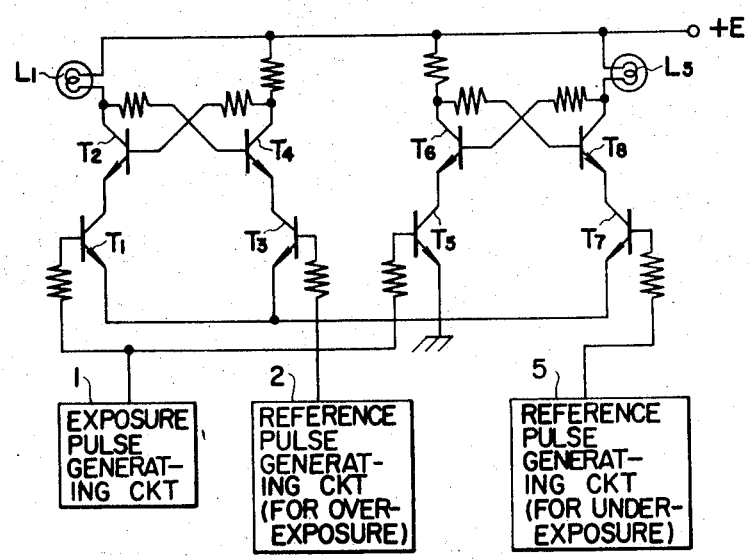
FIG. 1 shows a basic circuit diagram for explaining the principle of the present invention.

Referring to FIG. 1, showing a basic circuit for explaining the fundamental principle of the present invention, numeral 1 designates an exposure pulse generating circuit for generating an exposure pulse having a pulse width in inverse proportion to the intensity of the light from the object to be photographed. Numeral 2 designates a reference pulse generating circuit for generating a reference pulse ($b_1$) which has a predetermined pulse width for indicating that the exposure is excessive. Numeral 5 designates a reference pulse generating circuit similar to the circuit 2 but for generating a reference pulse ($b_4$) for indicating that the exposure is insufficient and the pulse width of the generated pulse is longer.

Figure 2:
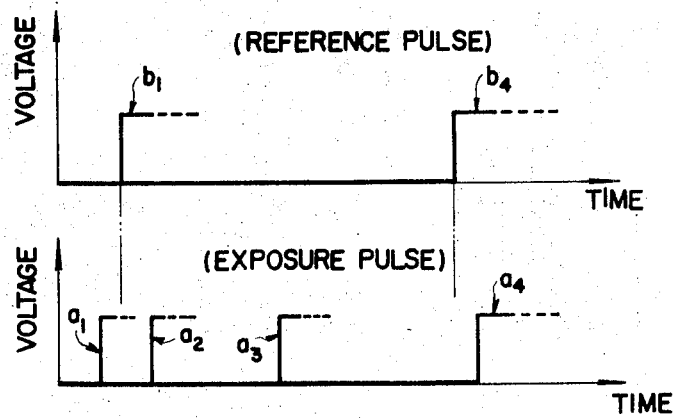
FIG. 2 shows an explanatory diagram giving exposure pulse shapes and reference pulse shapes.

When inputs are given to bases of transistors $T_1$ and $T_3$ in FIG. 1, the transistor to which the input pulse (rising portion) is given earlier becomes conductive. When one of transistors $T_1$ and $T_3$ is in conductive state, the other transistor does not cause any change in its state even when an input is given to it. For example, when an input with a pulse shape $a_1$ is given to the base of the transistor $T_1$ and an input with a pulse shape $b_1$ is given to the base of the transistor $T_3$ as shown in FIG. 2, the transistor $T_1$ becomes conductive but the transistor $T_3$ does not become conductive. That is, when no input is given to bases of transistor $T_1$ nor $T_3$, transistors $T_1$ and $T_3$ and transistors $T_2$ and $T_4$ are all non-conductive. When an input is given to the base of the transistor $T_1$ at first, the transistor $T_1$ becomes conductive. So, the transistor $T_2$ also becomes conductive and the lamp $L_1$ for indicating that the exposure is excessive lights. Even when an input is given to the base of the transistor $T_3$ after a certain time delay, the transistor $T_3$ becomes only ready for becoming conductive. At that time, however, the collector voltage of the transistor $T_2$ is already decreased by lighting of the lamp $L_1$. So, the base voltage of the transistor $T_4$ is decreased, the transistor $T_4$ becomes non-conductive and, consequently, the transistor $T_3$ cannot become conductive.

Therefore, the relation between the reference pulse and exposure pulse is as shown by the reference pulse shape $b_1$ and exposure pulse shape $a_1$ in FIG. 2, the over-exposure lamp $L_1$ lights to indicate that the exposing condition is an over-exposure. When said relation is as shown by the over-exposure reference pulse shape $b_1$ and exposure pulse shape $a_2$, of course the lamp $L_1$ does not light.

In FIG. 1, another pulse-width comparison circuit same as described above is composed of transistors $T_5$ through $T_8$. When the exposure pulse shape showing the intensity of the light from the object is as shown by the pulse $a_4$ relative to the reference pulse shape $b_4$ for under-exposure generated by the reference pulse generating circuit 5, transistors $T_7$ and $T_8$ become conductive, and the under-exposure warning lamp $L_3$ lights to indicate that the exposure is insufficient.

Figure 3:
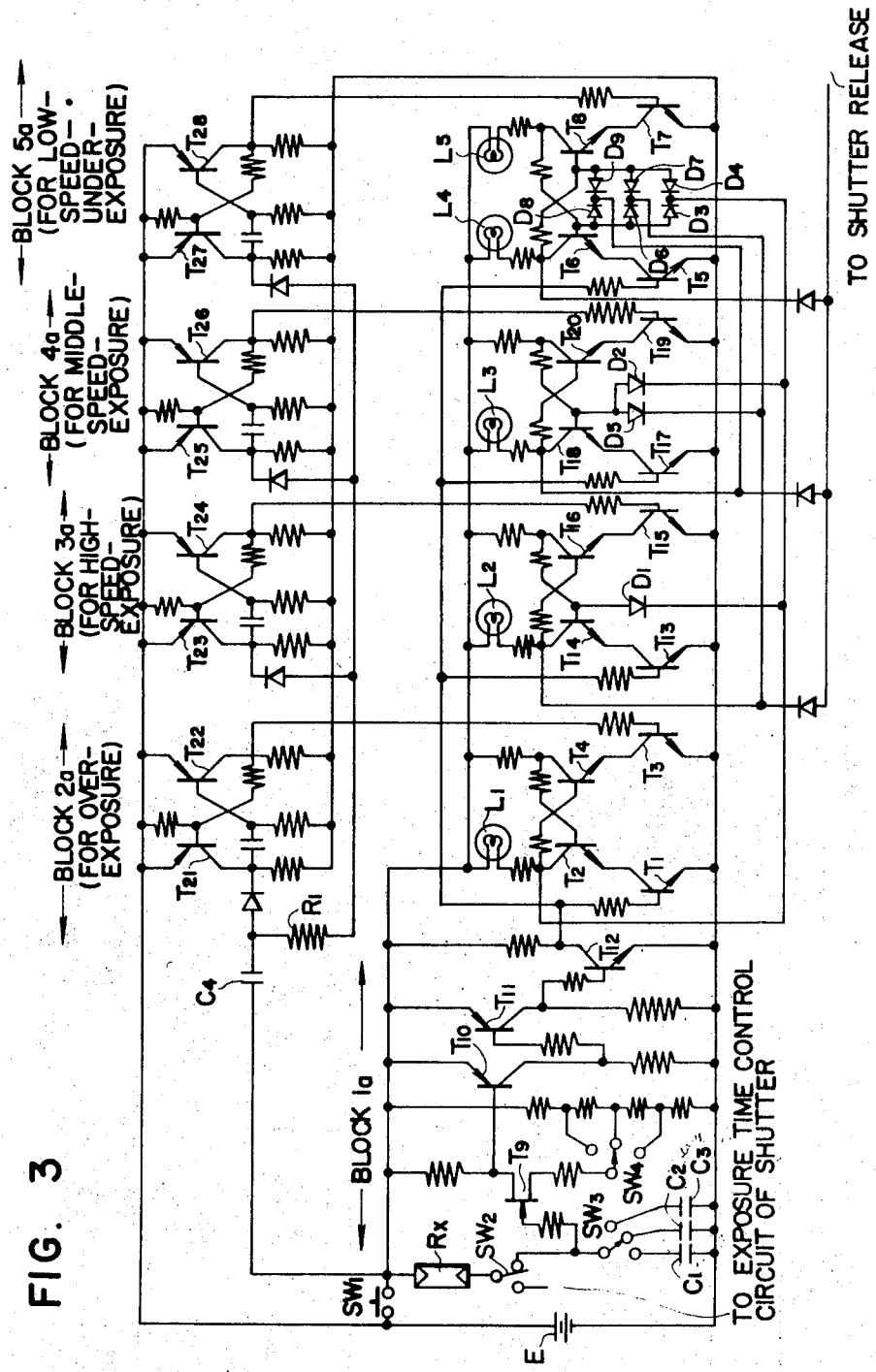
FIG. 3 shows a circuit diagram of another embodiment of the present invention.

In the above, cases of over-exposure and under-exposure are described according to the basic circuit. A more practical and concrete circuit is shown in FIG. 3 giving the same reference symbols to those parts having functions same as those shown in FIG. 1 and FIG. 2. This circuit is arranged to give over-exposure warning, high-speed exposure indication, middle-speed exposure indication, low-speed exposure indication and under-exposure warning by means of respective lamps $L_1$ through $L_5$ lit by pulse-width comparison circuits arranged by transistors $T_{13}$ through $T_{20}$ in the same way as shown in FIG. 1. In this circuit, the exposure pulse generating circuit shown in FIG. 1 is composed of the block $1_a$ including transistors $T_9$ through $T_{12}$ and reference pulse generating circuits are composed of blocks $2_a$ and $5_a$ which comprise mono-stable multi-vibrators. Besides, reference pulse generating circuits $3_a$ and $4_a$ for high-speed exposure and middle-speed exposure also comprise mono-stable multi-vibrators. Reference symbols $T_{21}$ through $T_{28}$ designate transistors.

Reference symbol $SW_2$ designates a selector switch used when a photoconductive element $Rx$ of the circuit according to the present invention is used in common to an exposure time control circuit for an electric shutter. Reference symbol $SW_3$ designates an ASA selector switch which is changed over among capacitors $C_1$ through $C_3$ as required. Reference symbol $SW_4$ designates a selector switch for compensation of exposure in case of EE photographing.

When the power switch $SW_1$ is closed in the state that when switches $SW_2$ and $SW_3$ are at positions shown in FIG. 3, reference pulse generating circuits $2_a$ through $5_a$ are actuated by the pulse voltage differentiated by the capacitor $C_4$ and resistor $R_1$. At the same time, the capacitor $C_2$ is charged through the photoconductive element Rx. Therefore, after a time in inverse proportion to the intensity of the light from the object (i.e., the time equivalent to the exposure pulse width) after the switch $SW_1$ is closed, the transistor $T_9$ becomes conductive. Consequently, the transistor $T_{10}$ becomes conductive, and transistors $T_{11}$ and $T_{12}$ remain non-conductive. Thus, an input is given to the base of the transistor $T_1$ as explained referring to FIG. 1. On the other hand, a reference pulse for over-exposure warning is applied to the base of the transistor $T_3$ by the mono-stable multi-vibrator comprising transistors $T_{21}$ and $T_{22}$. Therefore, when the relation between the reference pulse and exposure pulse is as shown by the pulse shape $b_1$ and pulse shape $a_1$ in FIG. 2, i.e., in case of over-exposure condition, the lamp $L_1$ lights.

In the above case, when widths of reference pulses for over-exposure warning, high-speed exposure indication, middle-speed exposure indication and low-speed exposure indication (used in common to under-exposure warning) are respectively $a_1$, $a_2$, $a_3$ and $a_4$, they are of course in the relation of $a_1 < a_2 < a_3 < a_4$. Therefore, lamps $L_2$ through $L_5$, which are not required to light, also tend to light. In the present embodiment, this problem is solved as follows. That is, when the lamp $L_1$ lights, diodes $D_1$ through $D_4$ reduce base voltages of transistors $T_{14}$, $T_{18}$, $T_6$ and $T_8$ ($T_8$ is included here to prevent the lamp $L_5$ from lighting after the lamp $L_4$ is put out) in order to prevent the other lamps $L_2$, $L_3$, $L_4$ and $L_5$ from lighting when the over-exposure warning lamp $L_1$ is put on. When the exposure pulse width at a light intensity of the object is $a_x$ and the relation of $a_x$ with reference pulse widths is $a_1 < a_x < a_2 < a_3 < a_4$, lamps $L_3$, $L_4$ and $L_5$ other than the high-speed exposure indication lamp $L_2$ also tend to light. To put out those unnecessary lamps, diodes $D_5$ through $D_7$ are utilized in the same way as above. Regarding the other cases, unnecessary lamps do not light in the same way as described above.

In the above-mentioned embodiment, an exposure pulse having a pulse width equivalent to the exposure time in second is directly compared with the reference pulse. However, this method may be inconvenient in actual photographing because it will take a long time to give a warning when the light intensity from the object is low. To solve this problem, it is possible to condense the exposure pulse width (of course also reference pulse widths) as required. For example, capacities of capacitors $C_1$ through $C_3$ may be changed to make the exposure pulse width about 1/500 times of the actual exposure time in second.

I claim:

1. An exposure warning circuit for photographic cameras comprising: at least one exposure-warning indicating means, at least one pulse-width comparison circuit having two input terminals connected to said exposure-warning indicating means, an exposure pulse generating circuit connected to one of the input terminals of said pulse-width comparison circuit and generating an exposure pulse with a pulse width in inverse proportion to the light intensity of the object, and at least one reference pulse generating circuit connected to the other input terminal of said pulse width comparison circuit and generating a reference pulse of predetermined pulse width relative to the exposure time to be warned; said exposure warning circuit controls the operation of said exposure-warning indicating means by making a comparison between pulse widths of said exposure pulse and reference pulse.

2. An exposure warning circuit for photographic cameras according to claim 1, in which said exposure-warning indicating means is a lamp.

3. An exposure warning circuit for photographic cameras according to claim 1, in which said pulse-width comparison circuit comprises a pair of transistors respectively having a base connected to the collector of the other transistor in the pair and another pair of transistors having collectors respectively connected to respective emitters of aforesaid pair of transistors.

4. An exposure warning circuit for photographic cameras according to claim 1, in which said exposure pulse generating circuit comprises a photoconductive element and capacitors connectable in series to said photoconductive element.

5. An exposure warning circuit for photographic cameras according to claim 1, in which said reference pulse generating circuit is arranged by a mono-stable multi-vibrator comprising transistors.

6. An exposure warning circuit for photographic cameras according to claim 1, in which said reference pulse generating circuit is arranged to generate a pulse of a width to warn over-exposure.

7. An exposure warning circuit for photographic cameras according to claim 1, in which said reference pulse generating circuit is arranged to generate a pulse of a width to indicate high-speed exposure.

8. An exposure warning circuit for photographic cameras according to claim 1, in which said reference pulse generating circuit is arranged to generate a pulse of a width to indicate middle-speed exposure.

9. An exposure warning circuit for photographic cameras according to claim 1, in which said reference pulse generating circuit is arranged to generate a pulse of a width to indicate low-speed exposure.

10. An exposure warning circuit for photographic cameras according to claim 1, in which said reference pulse generating circuit is arranged to generate a pulse of a width to warn under-exposure.

11. An exposure warning circuit for photographic cameras according to claim 1, in which pulse widths of said exposure pulse and said reference pulses are respectively condensed to 1/500.

12. An exposure warning circuit for photographic cameras comprising: an over-exposure warning lamp, a first pulse-width comparison circuit having two input terminals connected to said over-exposure warning lamp, a first reference pulse generating circuit connected to one of the input terminals of said first pulse-width comparison circuit and generating a reference pulse for over-exposure warning, a high-speed exposure indicating lamp whose one terminal is connected to said over-exposure warning lamp, a second pulse-width comparison circuit having two input terminals and having an output terminal connected to another terminal of said high-speed exposure indicating lamp, a second reference pulse generating circuit connected to one of the input terminals of said second pulse-width comparison circuit and generating a reference pulse for high-speed exposure indication, an exposure pulse generating circuit having an output terminal connected commonly to other input terminals of said first and second pulse width comparison circuit and generating an exposure pulse of a width in inverse proportion to the light intensity of the object to be photographed, and a diode inserted between output terminals of said first and second pulse-width comparison circuits, said exposure warning circuit is arranged to light only one of said over-exposure warning lamp and said high-speed exposure indicating lamp by making a comparison between the pulse width of said exposure pulse and pulse widths of respective reference pulses.

13. An exposure warning circuit for photographic cameras according to claim 12, in which said exposure warning circuit further comprises a middle-speed exposure indicating lamp whose one terminal is connected to said high-speed exposure indicating lamp, a third pulse-width comparison circuit whose one input terminal is connected to the output terminal of said exposure pulse generating circuit and whose output terminal is connected to the another terminal of said middle-speed exposure indicating lamp, a third reference pulse generating circuit connected to another terminal of said third pulse-width comparison circuit and generating a reference pulse for middle-speed exposure indication, a diode inserted between output terminals of said first and third pulse-width comparison circuits, and a diode inserted between output terminals of said second and third pulse-width comparison circuit, said exposure warning circuit is arranged to light only one out of said over exposure warning lamp, said high-speed exposure indicating lamp and said middle-speed exposure indicating lamp by making comparison among pulse widths of said exposure pulse and of reference pulses.

14. An exposure warning circuit for photographic cameras according to claim 13, in which said exposure warning circuit further comprises a low-speed exposure indicating lamp and an under-exposure warning lamp respectively having a terminal connected to said middle-speed exposure indicating lamp, a fourth pulse width comparison circuit whose one input terminal is connected to the output terminal of said exposure pulse generating circuit and whose one output terminal is connected to another terminal of said low-speed exposure indicating lamp and whose another output terminal connected to another terminal of said under-exposure warning lamp, a fourth reference pulse generating circuit connected to another input terminal of said fourth pulse-width comparison circuit and generating a reference pulse for low-speed exposure indicating pulse, diodes respectively inserted between output terminals of said first and fourth pulse-width comparison circuits, diodes respectively inserted between output terminals of said second and fourth pulse-width comparison circuits, and diodes respectively inserted between output terminals of said third and fourth pulse-width comparison circuits, said exposure warning circuit is arranged to light only one lamp out of said over-exposure warning lamp, said high-speed exposure indicating lamp, said middle-speed exposure indicating lamp, said low-speed exposure indicating lamp and said under-exposure warning lamp by making comparison between pulse widths of said exposure pulse and of each reference pulse.

* * * * *